(12) United States Patent
Majcen et al.

(10) Patent No.: US 8,997,618 B1
(45) Date of Patent: Apr. 7, 2015

(54) QUICK RELEASE BLADE LOCK ASSEMBLY

(71) Applicants: Marjan Majcen, South Orange, NJ (US); Beverly Burke-Majcen, South Orange, NJ (US); Robert Vreznik, South Orange, NJ (US); Martin Vehovar, South Orange, NJ (US)

(72) Inventors: Marjan Majcen, South Orange, NJ (US); Beverly Burke-Majcen, South Orange, NJ (US); Robert Vreznik, South Orange, NJ (US); Martin Vehovar, South Orange, NJ (US)

( * ) Notice: Subject to any disclaimer, the term of this patent is extended or adjusted under 35 U.S.C. 154(b) by 242 days.

(21) Appl. No.: 13/747,963

(22) Filed: Jan. 23, 2013

(51) Int. Cl.
 *B26D 7/26* (2006.01)
 *F16D 1/08* (2006.01)
(52) U.S. Cl.
 CPC ........................................ *F16D 1/08* (2013.01)
(58) Field of Classification Search
 CPC ......... B23D 47/00; B26D 7/2614; F16D 1/08
 USPC .......... 83/665–666, 698.41–698.61; 411/554, 411/160, 187, 532–533; 30/390
 See application file for complete search history.

(56) References Cited

U.S. PATENT DOCUMENTS

| | | | | | |
|---|---|---|---|---|---|
| 2,370,912 | A | * | 3/1945 | Pierce | 411/161 |
| 3,912,411 | A | * | 10/1975 | Moffat | 403/259 |
| 4,034,788 | A | * | 7/1977 | Melone | 411/134 |
| 4,245,438 | A | * | 1/1981 | van Buren, Jr. | 451/509 |
| 4,971,501 | A | * | 11/1990 | Chavez | 411/221 |
| 5,533,849 | A | * | 7/1996 | Burdick | 411/120 |
| 5,562,378 | A | * | 10/1996 | Blechschmidt et al. | 411/121 |
| 6,701,629 | B2 | * | 3/2004 | Krondorfer et al. | 30/390 |
| 7,497,766 | B2 | * | 3/2009 | Kraenzler et al. | 451/360 |
| 7,731,463 | B2 | * | 6/2010 | Davis | 411/119 |
| 2012/0304841 | A1 | * | 12/2012 | Bort | 83/665 |

* cited by examiner

*Primary Examiner* — Ned Landrum
*Assistant Examiner* — Nhat Chieu Do
(74) *Attorney, Agent, or Firm* — Michael I. Kroll

(57) ABSTRACT

Disclosed is a quick release lock for blades mountable to a motor driven rotary tool consisting of a tool mount for mounting to the mandrel of a motorized tool. A blade retainer and lock ring positioned on each side of a user provided blade with the blade retainer providing a bore having a plurality of channels and rails and the tool mount having a collar with corresponding exterior helical channels and rails whereby the blade retainer can quickly mounted onto the tool mount.

12 Claims, 11 Drawing Sheets

US 8,997,618 B1

QUICK RELEASE BLADE LOCK ASSEMBLY

BACKGROUND OF THE INVENTION

1. Field of the Invention

The present invention relates generally to tool attachments and, more specifically, to a quick release lock for blades mountable to a motor driven rotary tool. The quick release blade lock comprises a tool mount, blade retainer and lock ring.

The tool mount has a planar body portion with a right angle collar extending from the planar body portion. Interior threads in the collar bore allows the tool mount to be threadedly attached to the threaded drive of a motorized tool. Exteriorly, the collar has several helical channels and rails that form a mounting for the blade retainer having complementary channels and rails.

The tool mount's planar body portion has a front and back side with the front side having a plurality of peripheral longitudinal receptacles with one end of each receptacle terminating in an upward slope to the planar body surface.

One of the receptacles extends through the planar body forming a recess with an upward slope having spaced transverse ridges that lockingly engage corresponding transverse ridges positioned on the slope of the lock ring's cantilevered latching tabs so that when mated together the lock ring can not be detached from the tool mount until a force is applied to the lockingly engaged cantilevered latching tab where then the lock ring can be disengaged from the tool mount.

In use, the lock ring is not singularly mounted to the tool mount but is used in combination with the blade retainer to secure a blade between the two components so that when the blade-retainer/blade/lock-ring assembly is mounted onto the tool mount one of the lock ring's cantilevered tabs will seat into the tool mount recess where the ridges of the tool mount slope and cantilevered tab slope will lockingly engage.

The blade retainer has a front side and a back side with the front side also having a plurality of peripheral longitudinal receptacles with one end of the receptacles upwardly sloped. The back side has a right angle collar with interior channels and rails that are mateable to the channels and rails of the tool mount collar. Also provided are a plurality of blade mounts with each mount having a post-like tab with a terminal flange extending from the blade insert. The tabs will seat into corresponding lock ring receptacles having an interior lip so that when a blade is mounted onto the blade retainer the post-like tabs are then inserted into the lock ring's receptacles so that the blade retainer's tab flanges latch onto the lock ring's receptacle lips forming a blade-retainer/blade/lock ring assembly that can be easily mounted and dismounted from the tool mount.

The lock ring has a front and back side with a plurality of peripheral apertures correspondingly positioned to receive the blade retainer's post-like tabs so that when the tabs are seated within the lock ring apertures the lock ring and blade retainer are securely fastened together. The lock ring also provides a plurality of peripherally positioned cantilevered tabs spaced above the planar back surface of the lock ring. The cantilevered tabs comprise a sloped portion and a longitudinal portion with the upper surface of the slope and longitudinal portions having spaced apart transverse ridges. As aforementioned, the transverse ridges of the lock ring's sloped portion will lockingly engage the transverse ridges of the tool mount slope when the blade-retainer/blade/lock-ring is mounted onto the tool mount. The back side of the lock ring, which engages the blade has a plurality of nubs that serve as frictional elements.

In operation, the tool mount is threadedly attached to a motorized tool having a threaded drive so that blades having the blade retainer and ring lock attached thereto can be easily mounted and dismounted from the tool mount.

A user provided blade having a bore and radial apertures is enabled to be used on the tool mount by positioning the blade retainer on one side approximate the blade bore and positioning the lock ring on the opposing blade side wherethen the post-like tabs are inserted into the lock ring receptacles fixing the blade between the lock ring and the blade retainer.

The quick mounting and dismounting of a blade incorporating the blade retainer and lock ring is accomplished through a slope of the mating channels and rails that only requires about a 30 degree turn or a twelfth of a turn to mount and dismount the invention enabled blade from the tool mount without having the need for tools or the dismounting of the tool mount from the motorized tool's threaded drive.

The present invention further provides that the tool mount and blade retainer can be used without the blade lock to quickly mount and dismount a blade from a motorized tool's threaded drive without the need for fixedly positioning the user provided blade between the lock ring and the blade retainer.

2. Description of the Prior Art

There are other fasteners which provide for locking a blade to a tool. While these fasteners may be suitable for the purposes for which they where designed, they would not be as suitable for the purposes of the present invention as heretofore described.

It is thus desirable to provide a quick release blade lock having a motorized tool drive mounting portion incorporating a collar whereby a user provided blade having a bore is placed onto said collar then the blade retainer having interior bore channels and tracks is mounted onto the tool mounting portion also having a collar with exterior channels and tracks mateable to the channels and tracks of the blade retainer.

It is further desirable to provide a lock ring portion having front and back side with a plurality of peripheral receptacles correspondingly positioned to receive the blade retainer's post-like tabs so that when the tabs are seated within the lock ring apertures the lock ring and blade retainer are securely fastened together.

SUMMARY OF THE PRESENT INVENTION

A primary object of the present invention is to provide a quick release blade lock fastener for quickly mounting and dismounting a blade from a motorized tool.

Another object of the present invention is to provide a quick release blade lock comprising a tool mount, blade retainer and lock ring.

Another object of the present invention is to provide a quick release blade lock having a tool mount comprising a plate-like body with a right angle collar extending therefrom.

Yet another object of the present invention is to provide a quick release blade lock wherein said plate-like body has a plurality of peripheral longitudinal receptacles terminating in an upward slope with one of the receptacles extending through the plate-like body with the sloped portion having spaced transverse ridges.

Still yet another object of the present invention is to provide a quick release blade lock wherein said tool mount collar has a threaded interior bore for mounting the tool mount to a motorized tool's threaded drive and a plurality of exterior collar channels and rails for mounting the blade retainer onto the tool mount.

Another object of the present invention is to provide a quick release blade lock having a blade retainer having a plate-like body with a front side and a back side with the front side having a plurality of peripheral longitudinal apertures with one end of each aperture terminating in an upward slope through the body and the back side having a right angle collar with channels and rails on the interior that are mateable to the channels and rails of the tool mount collar and post-like tabs with terminal flanges that matingly engage a plurality of corresponding receptacles within the lock ring.

Yet another object of the present invention is to provide a lock ring having a front and back side with a plurality of peripheral receptacles correspondingly positioned to receive the blade retainer's post-like tabs so that when the tabs are seated within the lock ring receptacles the lock ring and blade retainer are securely fastened together.

Still yet another object of the present invention is to provide a lock ring having a plurality of peripherally positioned cantilevered tabs having a sloped portion and a longitudinal portion with each having spaced apart transverse ridges.

Additional objects of the present invention will appear as the description proceeds.

The present invention overcomes the shortcomings of the prior art by providing a quick release blade lock assembly comprising a tool mount, blade retainer and lock ring. The tool mount has a collar with exterior channels and rails and interior threads whereby the tool mount can be threadedly attached to the threaded drive of a motorized tool. The blade retainer and lock ring, which are matingly engageable are mounted to a blade creating a blade-retainer/blade/lock-ring assembly that is easily mounted to and dismounted from the tool mount by virtue of the mating channels and rails of the tool mount and blade retainer, which only require about a 30 degree rotation or about a twelfth of a turn of the blade-retainer/blade/lock-ring assembly for mounting the assembly onto the tool mount or dismounting the assembly from the tool mount.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
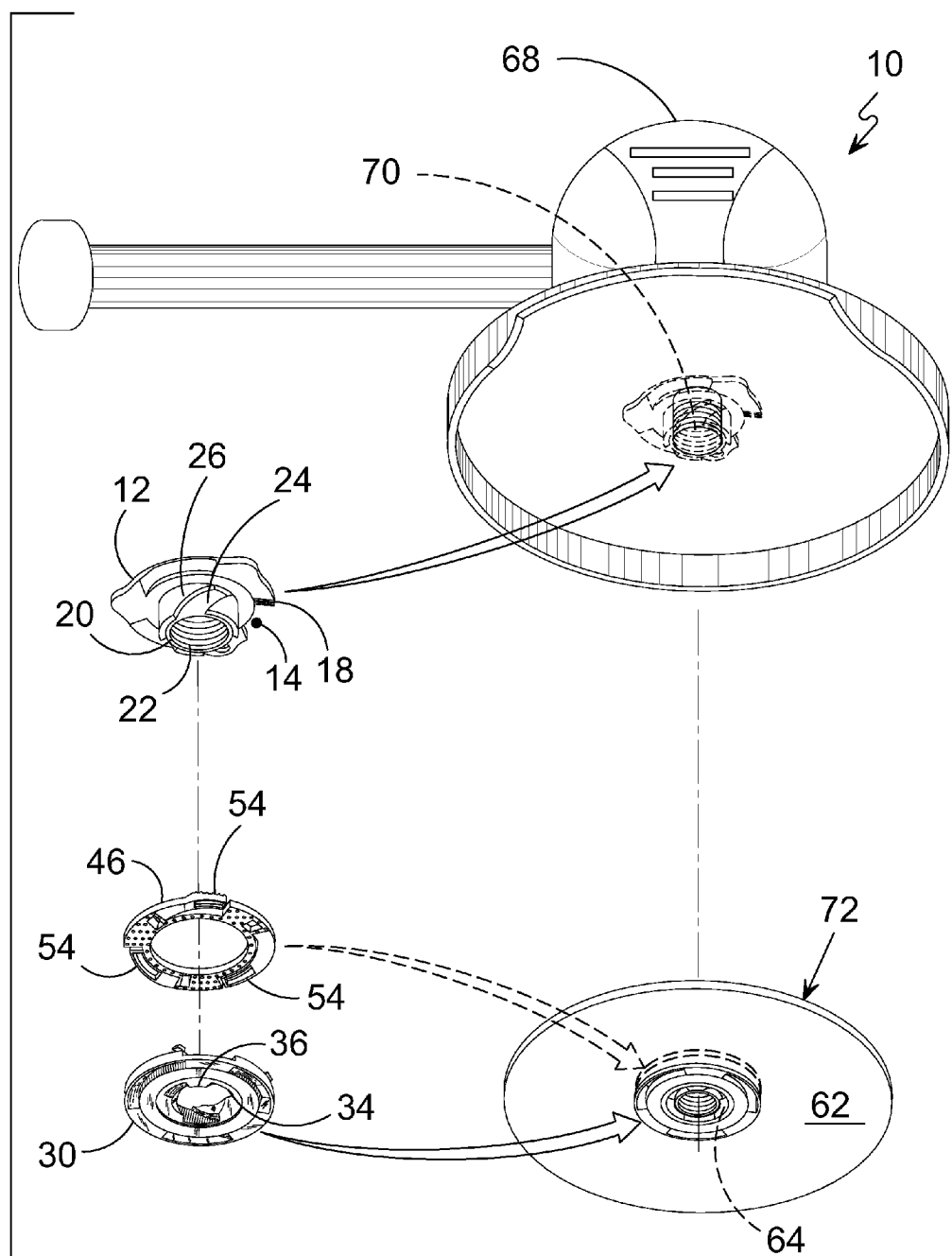
FIG. 1 is an exploded view of the quick release blade lock assembly.

Turning now descriptively to the drawings, in which similar reference characters denote similar elements throughout the several views, the figures illustrate the use of the present invention. With regard to the reference numerals used, the following numbering is used throughout the various drawing figures.

10 quick release blade lock assembly
12 tool mount
14 tool mount recess
16 tool mount receptacle slope
18 tool mount receptacle ridge
20 tool mount collar
22 tool mount collar interior threads
24 tool mount collar exterior channel
26 tool mount collar exterior rail
30 blade retainer
32 blade retainer collar
34 blade retainer collar interior channel
36 blade retainer collar interior rail
38 blade retainer tab
40 blade retainer tab flange
42 blade mount
46 lock ring
48 lock ring nubs
50 lock ring tab receptacles
52 lock ring tab receptacle lip
54 lock ring cantilevered latching tab
56 lock ring latching tab ridges
58 lock ring cantilevered latching tab slope
60 lock ring cantilevered latching tab slope ridges
62 blade
64 blade bore
66 blade mount insert
68 motorized tool
70 motorized tool arbor
72 blade-retainer/blade/lock-ring assembly
R rotation of 72
M mounting of 72
D dismount of 72

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an exploded view of the quick release blade lock assembly. The quick release blade assembly 10 includes is a fastener for blades 62 having a bore 64 that are typically mounted onto the arbor of a motorized tool 68 and fastened thereon by a locking element. The present invention provides a quick release blade lock 10 comprising a tool mount 12 having a collar 20 with interior threads 22 that is mountable to a motorized tool's threaded drive 70; a blade retainer 30 that quickly mounts to and dismounts from the tool mount 12 without having to remove the tool mount 12 from the threaded drive 70 and a lock ring 46 that can be used in conjunction with the blade retainer 30 to hold a blade 62 therebetween. The tool mount collar 20 has a plurality of exterior spiral-like channels 24 and rails 26 with the blade retainer 30 having interior helical channels 34 and rails 36 mateable to the tool mount's 12 helical channels 24 and rails 26. The incline of each channel and rail slope accommodates removal of the blade retainer from the tool mount 12 in about a 30 degree manual turn. Fastening the lock ring 46 to the blade retainer 30, having a blade 62 held therebetween, prevents the removal of the blade retainer/blade/lock ring assembly 72 until one of the lock ring tabs 54, seated within a tool mount recess 14 during mounting of the assembly 72, is moved out of its seated position within the tool mount recess 14 wherethen said assembly can be manually rotated to dismount the assembly 72 from the tool mount 12 without the need for additional tools or removal of the tool mount 12.

Figure 2:
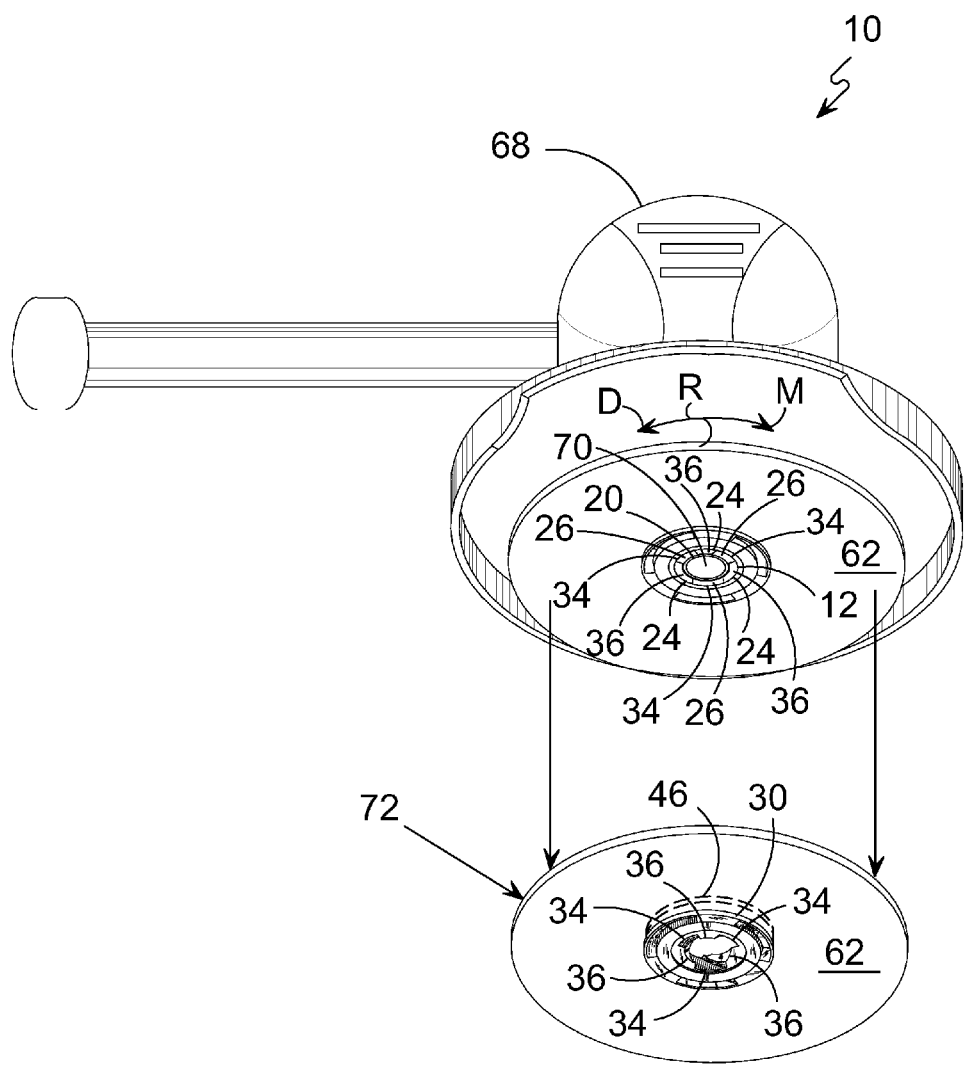
FIG. 2 is an illustrative view of the quick release blade lock assembly in use.

Referring to FIG. 2, shown is an illustrative view of the quick release blade lock assembly in use. Illustrated is a motorized tool 68 having a threaded drive 70 employing the quick release blade lock 10 for mounting a blade 62 to said threaded drive 70. The tool mount 12 of the quick release blade lock (shown in FIG. 1) is threadedly mounted to the motorized tool's threaded drive 70 wherethen a blade 62 having the lock ring 46 and blade retainer 30 mounted thereto forming blade-retainer/blade/lock-ring assembly 72 can be easily mounted onto the tool mount 12 by aligning the blade retainer's rails 36 to the tool mount's channels 24 then rotating, about a sixth of a turn, until the blade retainer rails 36 are seated within the tool mount's channels 24 and the tool mount's rails 26 are seated within the blade retainer's channels 34. The incline slopes of the channels 24,34 and rails 26,36 accommodates mounting and dismounting the blade retainer 30 in an approximate 30 degree rotation R for mounting M and dismounting D blade retainer 30. Fastening the lock ring 46 to the blade retainer 30, having a blade 62 fixed therebetween, prevents the removal of the blade-retainer/blade/lock-ring assembly 72 until a predetermined one of the lock ring tabs 48 is moved out of its seated position within the tool mount recess 14.

Figure 3A:
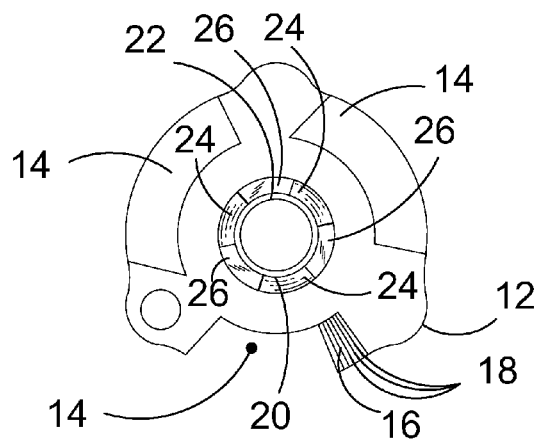
FIG. 3A is a front view of the tool collar of the present invention.
Figure 3B:
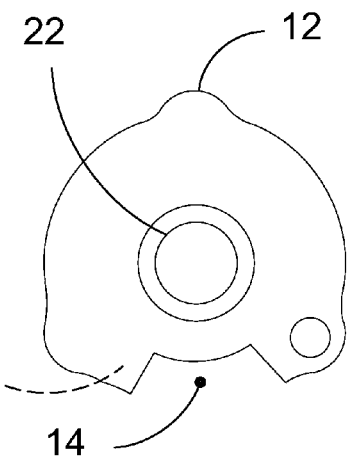
FIG. 3B is a rear view of the tool collar of the present invention.
Figure 3C:
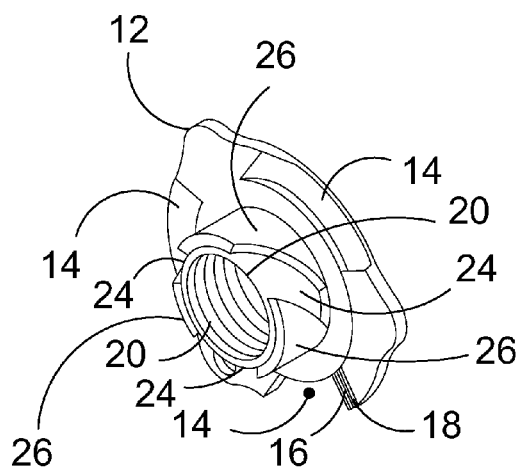
FIG. 3C is a perspective view of the tool collar of the present invention.

Referring to FIGS. 3A through 3C, shown are front, rear and perspective views of the tool mount of the present invention. The tool mount 12 of the quick release blade lock assembly 10 provides quick means for manually mounting and manually dismounting various blades from a motorized tool's driven shaft having the tool mount 12 releasably attached thereto without the need for additional tools. The tool mount 12 has a plate-like body with a right angle collar 20 having interior threads 22 providing means for releasably fastening the tool mount to the threaded drive shaft of a motorized tool. helical channels 24 and rails 26 on the collar's exterior provides means for mounting the blade retainer 30 that also has a collar 32 with corresponding helical channels and rails on the interior of the blade retainer's collar. A plurality of peripheral recesses 14 within the tool mount body are also provided serving as receptacles for the lock ring latching tabs 54.

Figure 4A:
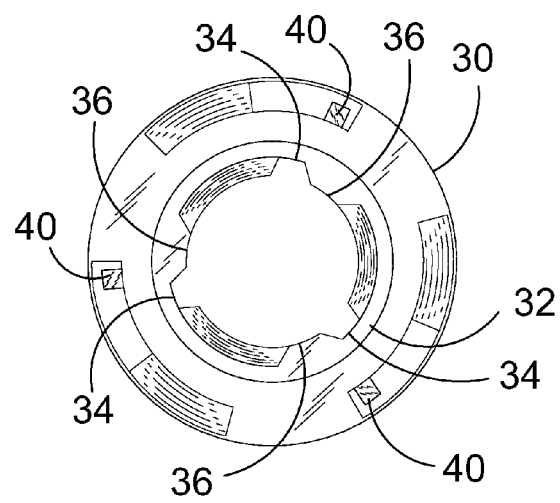
FIG. 4A is a front view of the blade retainer of the present invention.
Figure 4B:
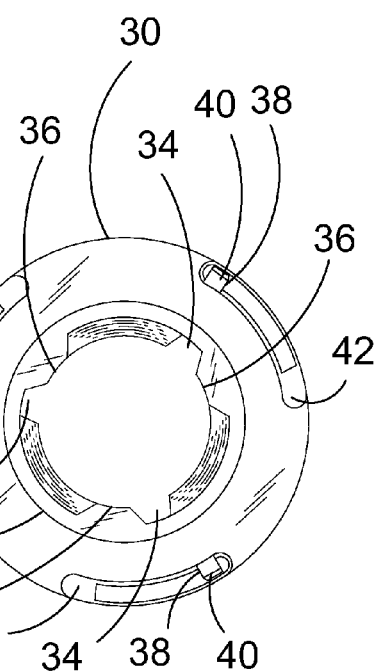
FIG. 4B is a rear view of the blade retainer of the present invention.
Figure 4C:
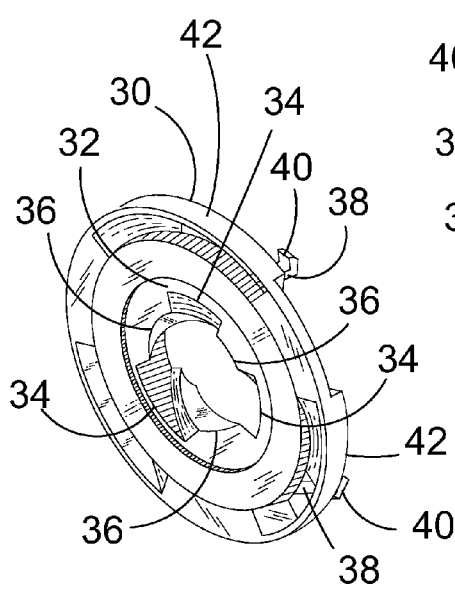
FIG. 4C is a perspective view of the blade retainer of the present invention.

Referring to FIG. 4A through 4C, shown are front, rear and perspective views of the blade retainer of the present invention. The blade retainer 30 has a front side and a back side with the front side having a plurality of peripheral receptacles with one end of the receptacles extending into an upwardly sloped portion. The back side has a right angle collar 32 with interior channels 34 and rails 36 that are mateable to the channels 24 and rails 26 of the tool mount collar 20. Further provided are a plurality of blade insert 42 projections that are inserted into provided blade apertures 66. Extending from each of the blade insert projections 42 is a post-like tab 38 having terminal flange 40 that will seat in corresponding lock ring receptacles 50 having an interior lip 52 (shown in FIGS. 5A-5C).

Figures 5A, 5B, 5C:
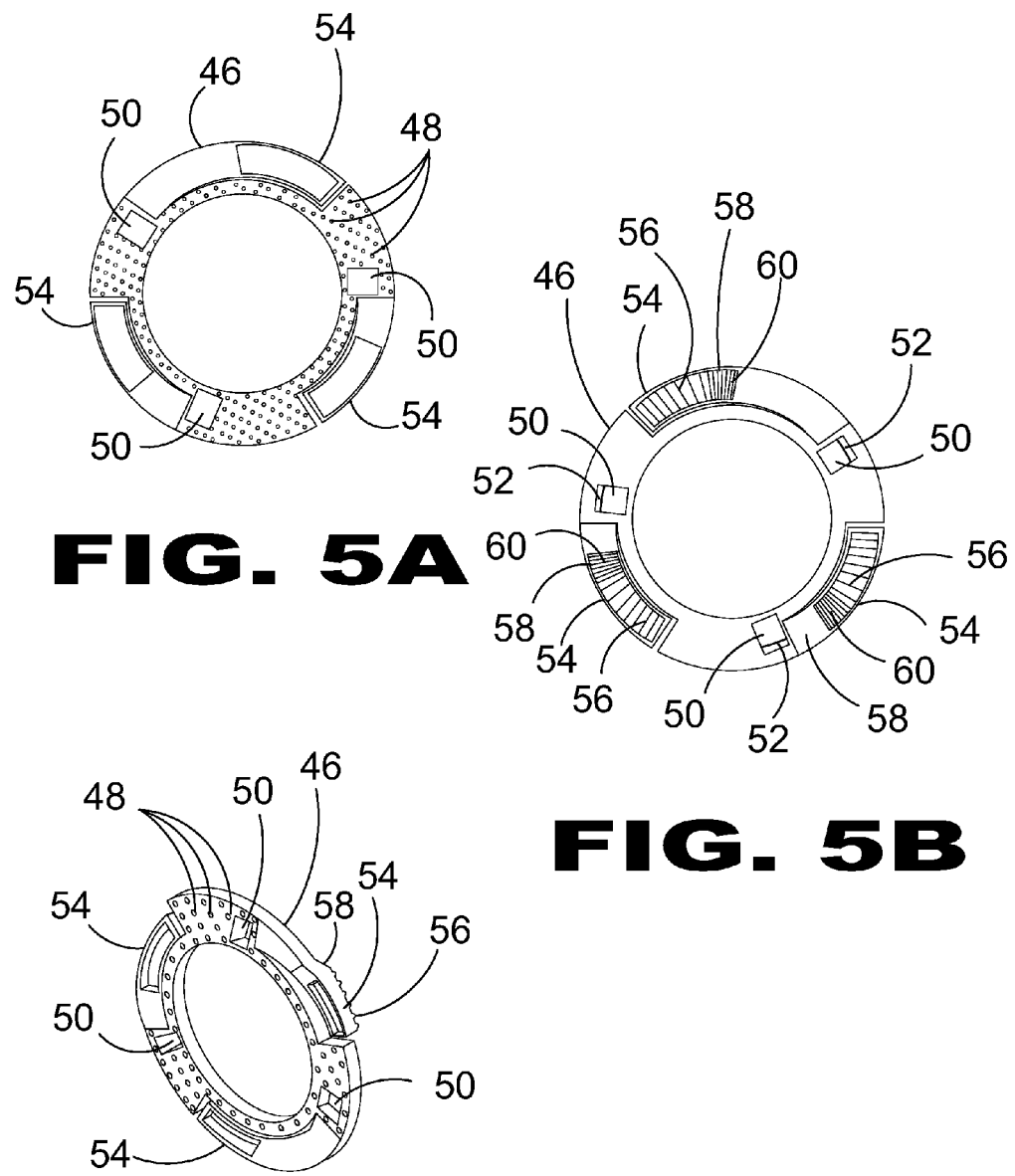
FIG. 5A is a front view of the lock ring of the present invention.
FIG. 5B is a rear view of the lock ring of the present invention.
FIG. 5C is a perspective view of the lock ring of the present invention.

Referring to FIG. 5A through 5C, shown are illustrative views of the lock ring of the quick release blade lock assembly of the present invention. The lock ring 46 has a front and back side with a plurality of peripheral tab receptacles 50 having lip 52 correspondingly positioned to receive the blade retainer's post-like tabs 38 having flange 40 so that when the tabs 38 are seated within the lock ring receptacles 50 flange 40 engages lip 52 thereby fastening the lock ring 46 to the blade retainer 30. The lock ring 46 also provides a plurality of peripherally positioned cantilevered tabs 54 spaced above the planar back surface of the lock ring 46. The cantilevered tabs 54 comprise a sloped portion 58 and a peripheral portion 54 with the upper surface of the peripheral portions having spaced apart transverse ridges 56 and the sloped portions having transverse ridges 60. As aforementioned, the transverse ridges of one of the lock ring's sloped portions 60 will lockingly engage the transverse ridges of the tool mount slope 18 when the blade-retainer/blade/lock-ring 72 is mounted onto the tool mount 12. The back side of the lock ring 46, which engages the blade 62 has a plurality of nubs 48 that serve as frictional elements.

Figure 6:
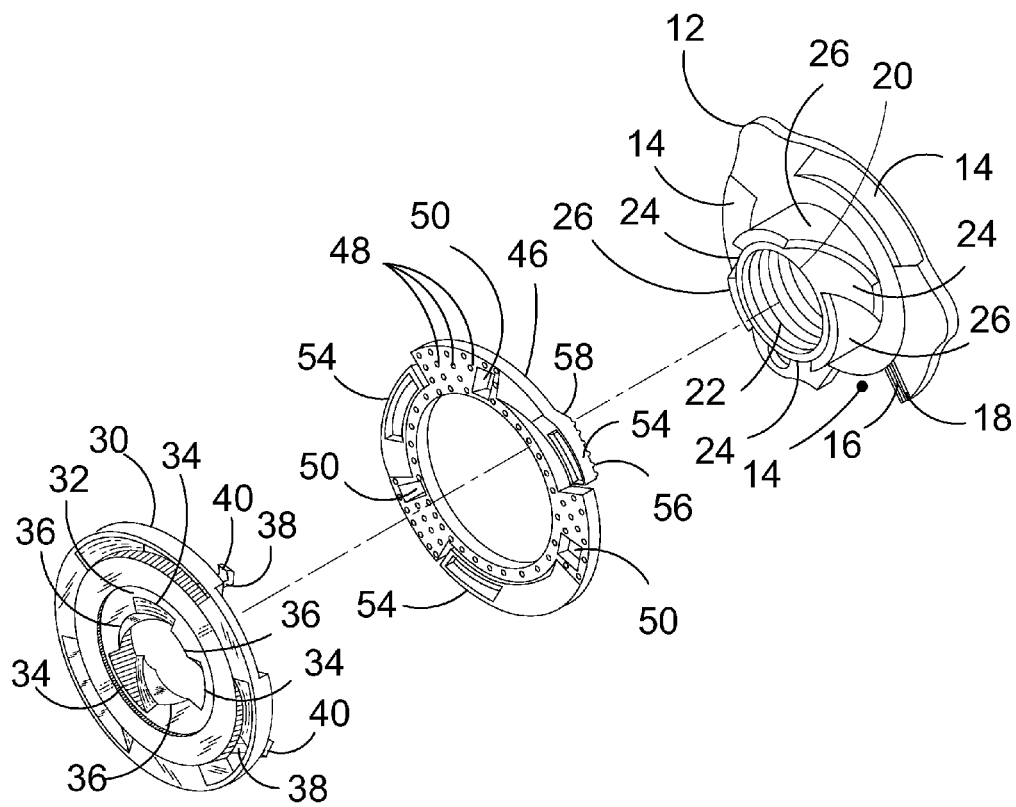
FIG. 6 is an exploded view of the quick release blade lock assembly components of the present invention.

Referring to FIG. 6, shown is an exploded view of the quick release blade lock assembly components of the present invention. Usually motorized tools having axially rotating blades provide a threaded mandrel with a fastener for securing a blade onto the mandrel with the fastener typically requiring another tool for threading the fastener onto and off of the mandrel. In a production environment it may be necessary to use different types of blades on the same motorized tool thereby increasing production costs through the process of locating the fastener driving tool, next removing the fastener from the mandrel then detaching one blade from the mandrel and mounting another blade onto the mandrel and finally threadedly attaching and tightening the fastener thereby securing the blade to the mandrel. The present invention obviates the need for additional tools to accomplish blade changing and shortens the time needed to change blades by providing a tool mount 12 that can be permanently or semi-permanently threaded onto the mandrel 70 and enabling blades to be securely fastened to the tool mount 12 by fastening a blade retainer 30 and lock ring 46 to blades thereby forming a blade retainer/blade/lock ring assembly 72 that by virtue of the blade retainer's interior channels 34 and rails 36 mounts onto the tool mount collar's exterior channels 24 and rails 26.

Figure 7:
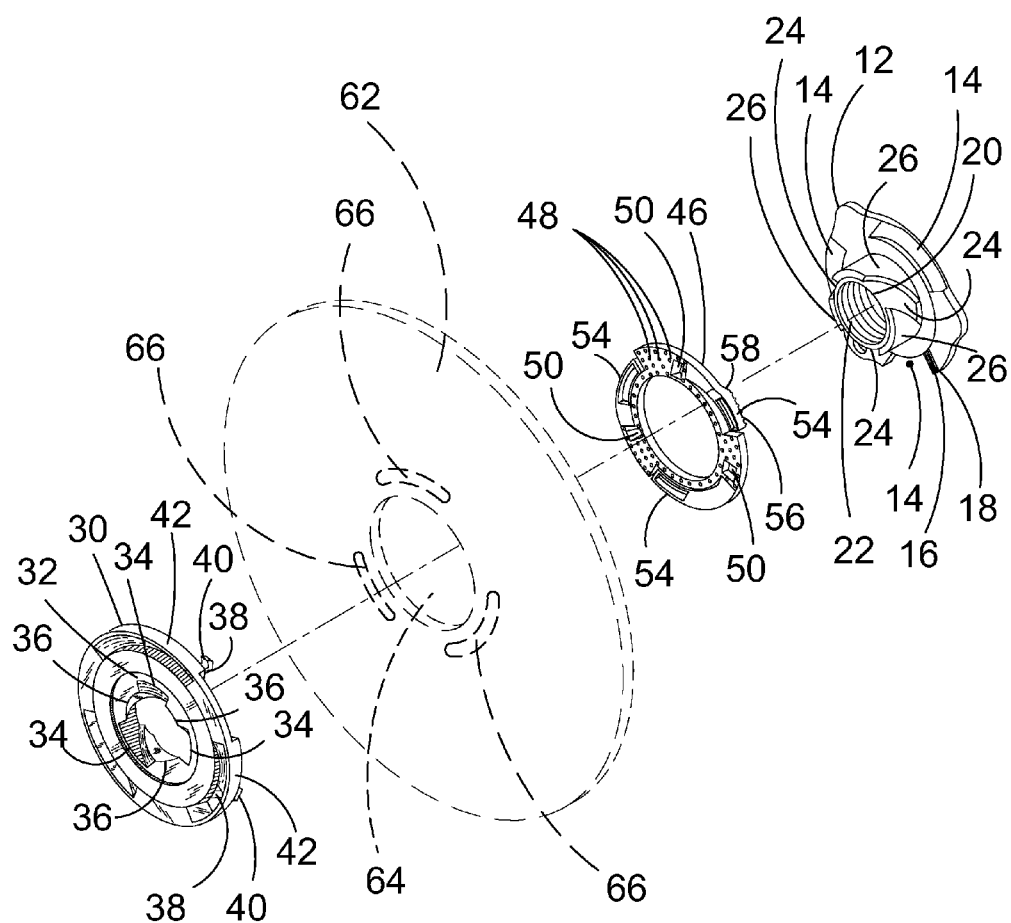
FIG. 7 is an exploded view of the quick release blade lock assembly with a user provided blade.

Referring to FIG. 7, shown is an exploded view of the quick release blade lock assembly with a user provided blade. The blade retainer 30 has a front side and a back side with the front side having a plurality of peripheral receptacles with one end of the receptacles extending into an upwardly sloped portion. The back side has a right angle collar 32 with interior channels 34 and rails 36 that are mateable to the channels 24 and rails 26 of the tool mount collar 20. Further provided are a plurality of blade mounts 42 that are inserted into provide blade 62 apertures 66. Extending from each of the blade mounts 42 is a post-like tab 38 having terminal flange 40 that will seat in corresponding lock ring receptacles 50 having an interior lip 52.

Figure 8:
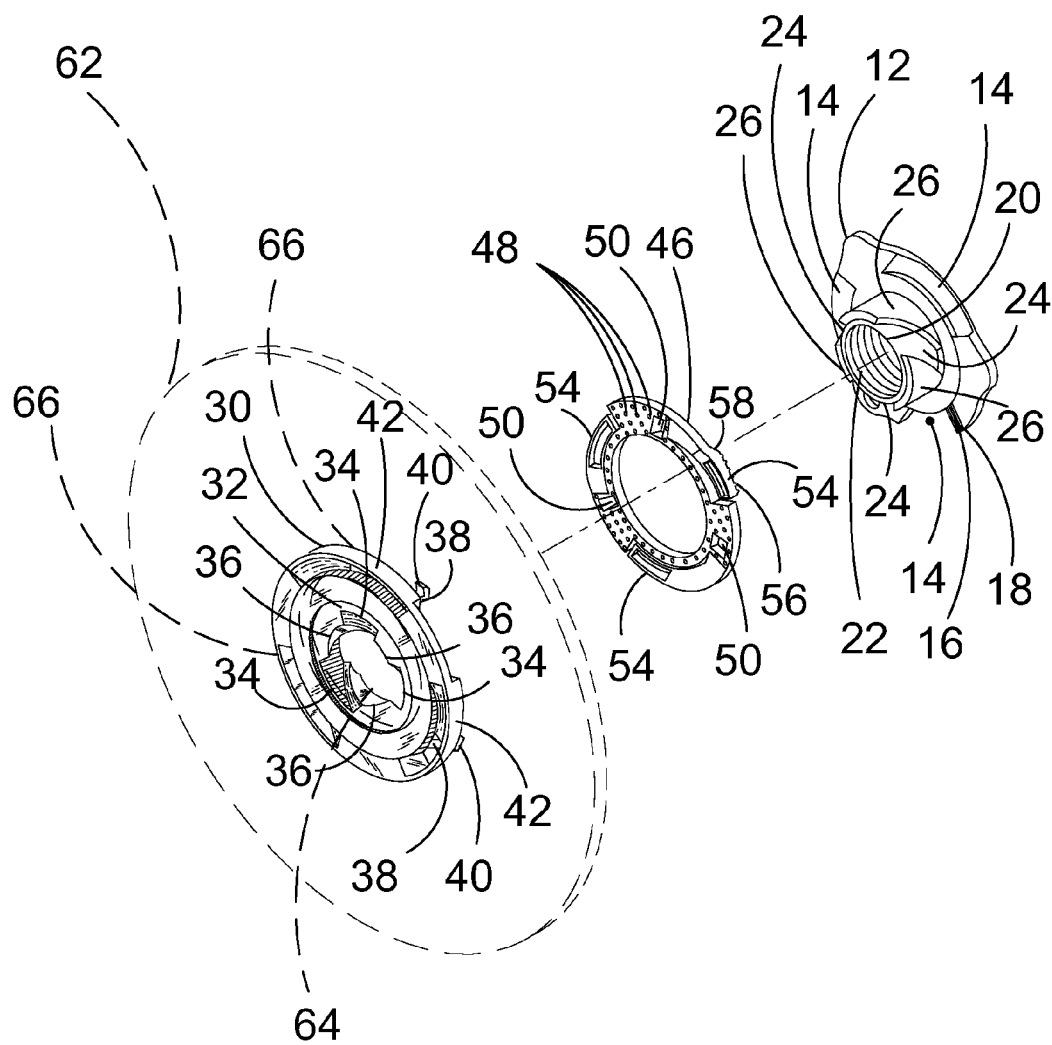
FIG. 8 is the blade retainer positioned on a user provided blade.

Referring to FIG. 8, shown is the blade retainer positioned on a user provided blade. The blade retainer 30 has a front side and a back side with the front side having a plurality of peripheral receptacles with one end of the receptacles extending into an upwardly sloped portion. The back side has a right angle collar 32 with interior channels 34 and rails 36 that are mateable to the channels 24 and rails 26 of the tool mount collar 20. Further provided are a plurality of blade mounts 42 that are inserted into provided blade 62 apertures 66. Extending from each of the blade mounts 42 is a post-like tab 38 having terminal flange 40 that will seat in corresponding lock ring receptacles 50 having an interior lip 52.

Figure 9:
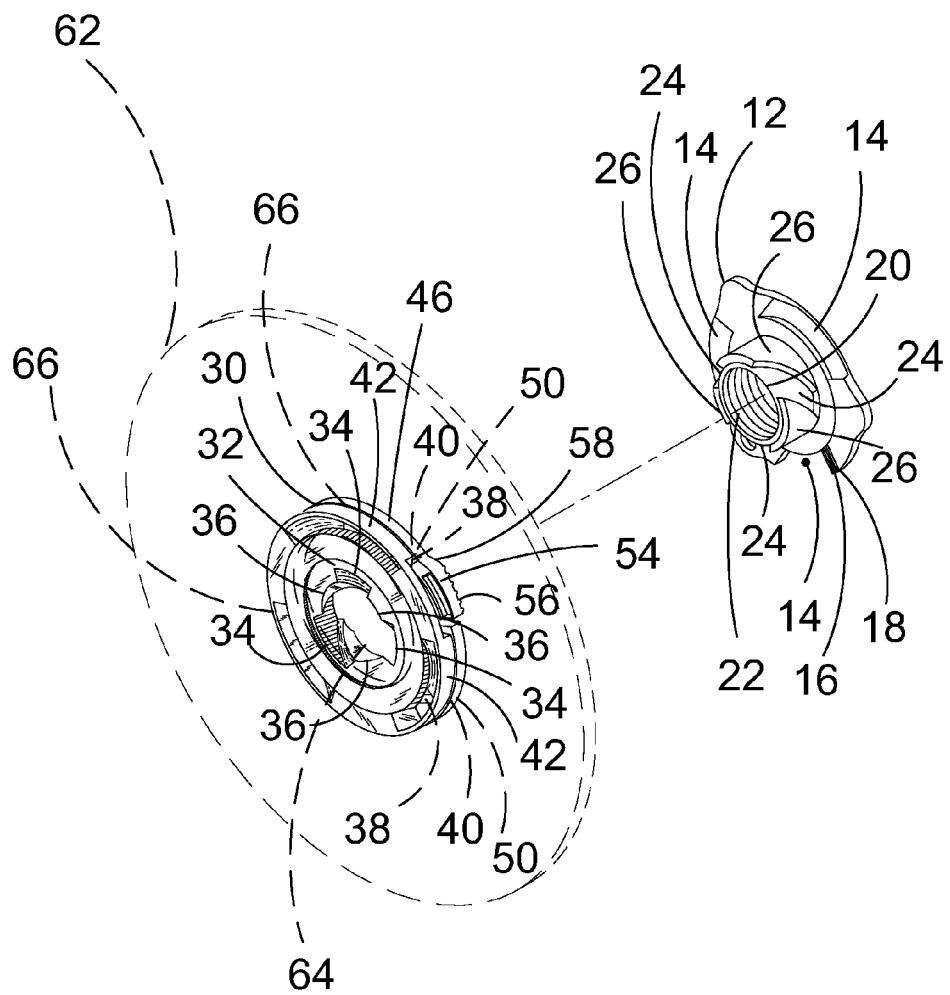
FIG. 9 is the blade retainer and lock ring positioned on a user provided blade.

Referring to FIG. 9, shown is the blade retainer and lock ring positioned on a user provided blade. The blade retainer 30 has a front side and a back side with the front side having a plurality of peripheral receptacles with one end of the receptacles extending into an upwardly sloped portion. The back side has a right angle collar 32 with interior channels 34 and rails 36 that are mateable to the channels 24 and rails 26 of the tool mount collar 20. Further provided are a plurality of blade mounts 42 that are inserted into provided blade 62 apertures 66. Extending from each of the blade mounts 42 is a post-like tab 38 having terminal flange 40 that will seat in corresponding lock ring receptacles 50 and latch over interior lip 52 creating a blade retainer/blade/lock ring 72.

Figure 10:
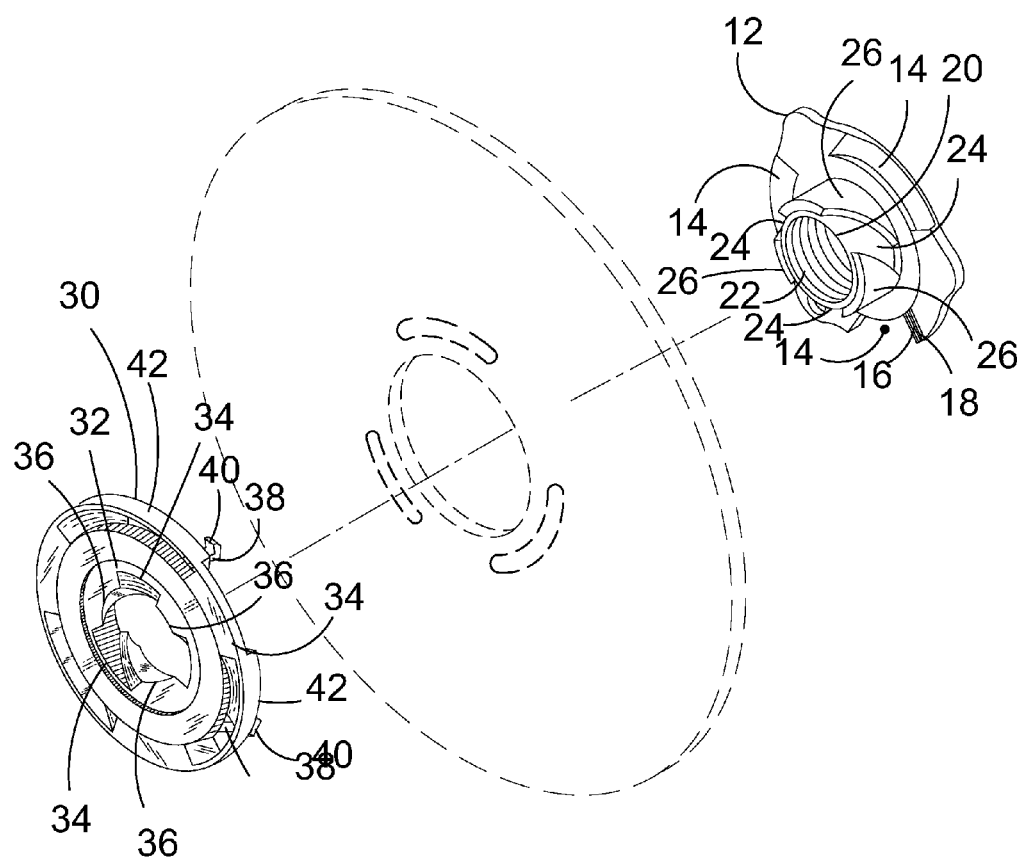
FIG. 10 is an additional element of the present invention.
Figure 11:
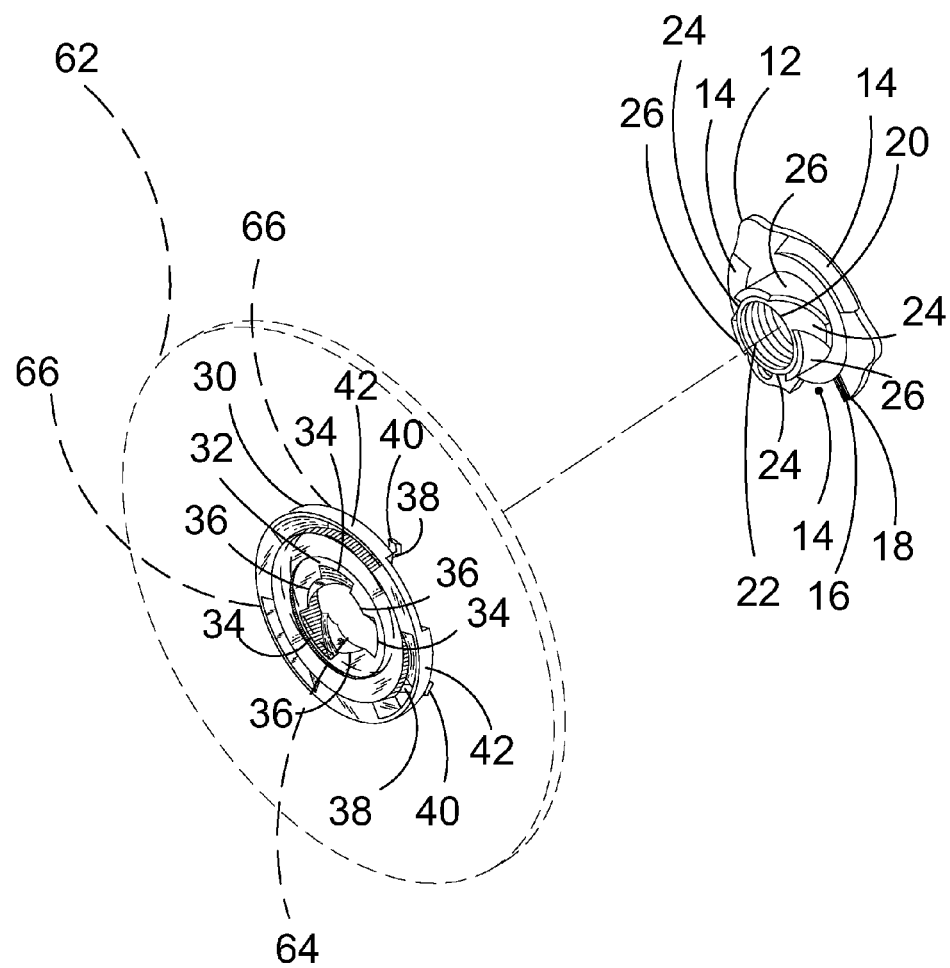
FIG. 11 is an additional element of the present invention.

Referring to FIGS. 10 and 11, shown is an additional element of the present invention. The present invention provides that the blade retainer 30 can be used without the lock ring to secure a user provided blade to the tool mount 12. The blade retainer 30 has a front side and a back side with the front side having a plurality of peripheral receptacles with one end of the receptacles extending into an upwardly sloped portion. The back side has a right angle collar 32 with interior channels 34 and rails 36 that are mateable to the channels 24 and rails 26 of the tool mount collar 20. Further provided are a plurality of blade mounts 42 that are inserted into provided blade 62 apertures 66.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A quick release blade lock assembly for use with a motor driven rotary tool comprising:
    a) a tool mount having a plate-like body portion and a right angle collar with an interior threaded through bore extending from the plate-like body portion so that the tool mount configured to be threadedly fastened onto a mandrel of said motor driven rotary tool and said collar exterior having a plurality of helical channels and rails;
    b) a blade retainer having a front side and a back side comprising a plate-like body portion on the front side and a a right angle collar on the back side extending from the plate-like body portion with said collar having a plurality of collar interior helical channels and rails whereby said blade retainer configured to be mounted onto said tool mount;
    c) said tool mount plate-like body portion having a plurality of peripheral receptacles with one end of the receptacles extending into an upwardly sloped portion; and
    d) wherein one of said peripheral receptacles extends through the plate-like body portion forming a receptacle recess with the sloped portion having a plurality of spaced apart transverse ridges.

2. The quick release blade lock assembly of claim 1, further providing a lock ring having a front side and a back side with a plurality of peripheral tab receptacles extending between said front side and said back side of the lock ring each having an interior receptacle lip.

3. The quick release blade lock assembly of claim 2, wherein said lock ring front side has a planar surface with a plurality of nubs arrayed across said planar surface.

4. The quick release blade lock assembly of claim 3, wherein said lock ring back side provides a plurality of peripherally positioned cantilevered tabs.

5. The quick release blade lock assembly of claim 1, wherein said blade retainer further provides a plurality of peripherally positioned blade mounts on the back side of the blade retainer spaced away from said collar.

6. The quick release blade lock assembly of claim 5, wherein each of said blade retainer's blade mounts have a post-like tab terminating in a post-like tab flange with said post-like tab correspondingly positioned to matingly engage the lock ring receptacles with a user provided blade therebetween.

7. The quick release blade lock assembly of claim 6, wherein said user provided blade further provides a plurality of arrayed apertures whereby the blade retainer's blade mounts are seated in said apertures with each post-like tab extending therebeyond.

8. The quick release blade lock assembly of claim 7, wherein each post-like tab flange is correspondingly positioned to matingly engage a lock ring's receptacle.

9. The quick release blade lock assembly of claim 8, wherein said user provide blade has a blade retainer positioned on one side and the lock ring positioned on the other side with each blade retainer's post-like tab flange latched over the lock ring's receptacle lips thereby forming a blade retainer/blade/lock ring assembly configured to be inserted over the tool mount.

10. The quick release blade lock assembly of claim 9, wherein said blade retainer/blade/lock ring assembly when mounted onto said tool mount causes the lock ring cantilevered tabs to seat within the tool mount's receptacles thereby securing said blade retainer/blade/lock ring assembly to said tool mount.

11. The quick release blade lock assembly of claim 9, wherein said blade retainer/blade/lock ring assembly can be dismounted from said tool mount by depressing the lock ring's cantilevered tab positioned within the tool mount's receptacle recess.

12. The quick release blade lock assembly of claim 11, where the mounting of said blade retainer/blade/lock ring assembly to said tool mount to a locked state and the dismounting of said blade retainer/blade/lock ring assembly from said tool mount to a removed state is accomplished though a twelfth of a rotation of said blade retainer/blade/lock ring assembly approximately 30 degrees.

* * * * *